United States Patent
Li et al.

(10) Patent No.: US 10,263,753 B2
(45) Date of Patent: Apr. 16, 2019

(54) SUB-CHANNEL SELECTION BASED ON TRANSMIT POWER

(71) Applicant: Apple Inc., Cupertino, CA (US)

(72) Inventors: Lei Li, Cupertino, CA (US); Xiaojun Chen, Cupertino, CA (US); Vusthla Sunil Reddy, Cupertino, CA (US); Diego C. Hernandez, Cupertino, CA (US); Peter M. Agboh, Cupertino, CA (US); Mohit Narang, Cupertino, CA (US); Ruben Caballero, Cupertino, CA (US); Indranil S. Sen, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 157 days.

(21) Appl. No.: 14/850,834

(22) Filed: Sep. 10, 2015

(65) Prior Publication Data
US 2016/0249361 A1   Aug. 25, 2016

Related U.S. Application Data

(60) Provisional application No. 62/118,134, filed on Feb. 19, 2015.

(51) Int. Cl.
*H04L 5/00* (2006.01)
*H04W 72/08* (2009.01)
(Continued)

(52) U.S. Cl.
CPC ............ *H04L 5/0064* (2013.01); *H04L 5/006* (2013.01); *H04W 72/085* (2013.01); *H04W 72/0453* (2013.01); *H04W 84/12* (2013.01)

(58) Field of Classification Search
CPC .... H04L 5/0064; H04L 5/006; H04W 72/085; H04W 72/0453; H04W 84/12
See application file for complete search history.

(56) References Cited

U.S. PATENT DOCUMENTS

| 7,978,724 B1* | 7/2011 | Mansour | H04L 5/0046 |
|---|---|---|---|
| | | | 370/436 |
| 2009/0023434 A1* | 1/2009 | Trainor | H04W 4/02 |
| | | | 455/418 |

(Continued)

*Primary Examiner* — Andrew Lai
*Assistant Examiner* — Chuong M Nguyen
(74) *Attorney, Agent, or Firm* — Sterne, Kessler, Goldstein & Fox P.L.L.C.

(57) ABSTRACT

In order to improve the quality of communication between electronic devices, one or more sub-channels used during communication between the electronic devices are dynamically modified based on one or more performance metrics and allowed transmit powers of the sub-channels. In particular, when the one or more performance metrics indicate that a distance between the electronic devices falls within a mid-range of distances, the one or more performance metrics may be used to guide selective changes to the sub-channels used during the communication based on the allowed transmit powers. The changes to the sub-channels used during the communication may increase, decrease or leave the total bandwidth unchanged. Moreover, by changing the sub-channels used during the communication, the allowed transmit power(s) of the sub-channel(s) used may be increased, which may improve the performance during the communication.

20 Claims, 8 Drawing Sheets

(51) Int. Cl.
*H04W 84/12* (2009.01)
*H04W 72/04* (2009.01)

(56) References Cited

U.S. PATENT DOCUMENTS

| | | | |
|---|---|---|---|
| 2010/0099450 A1* | 4/2010 | Lu | H04W 72/0406 455/501 |
| 2011/0263264 A1* | 10/2011 | Fan | H04W 92/20 455/449 |
| 2012/0157151 A1* | 6/2012 | Chu | H04W 52/40 455/522 |
| 2012/0270592 A1* | 10/2012 | Ngai | H04W 52/226 455/522 |
| 2015/0071295 A1* | 3/2015 | Hui | H04L 45/48 370/400 |
| 2015/0085765 A1* | 3/2015 | Tavildar | H04L 5/0073 370/329 |
| 2015/0087350 A1* | 3/2015 | Wang | H04W 52/38 455/522 |
| 2015/0215950 A1* | 7/2015 | Amini | H04W 52/0212 370/252 |
| 2016/0242195 A1* | 8/2016 | Kwon | H04W 72/121 |

* cited by examiner

SUB-CHANNEL SELECTION BASED ON TRANSMIT POWER

CROSS REFERENCE TO RELATED APPLICATION

This application claims priority under 35 U.S.C. § 119(e) to U.S. Provisional Application Ser. No. 62/118,134, entitled "Sub-Channel Selection Based on Transmit Power," by Lei Li, Xiaojun Chen, Vusthla Sunil Reddy, Diego C. Hernandez, Peter M. Agboh, Mohit Narang, Ruben Caballero and Indranil Sen, filed on Feb. 19, 2015, the contents of which are herein incorporated by reference.

BACKGROUND

Field

The described embodiments relate to techniques for improving communication performance in a wireless network, including techniques for selecting sub-channels used during communication between electronic devices based on allowed transmit powers for the sub-channels.

Related Art

Many modern electronic devices include a networking subsystem that is used to wirelessly communicate with other electronic devices. For example, these electronic devices can include a networking subsystem with a cellular network interface (UMTS, LTE, etc.), a wireless local area network interface (e.g., a wireless network such as described in the Institute of Electrical and Electronics Engineers (IEEE) 802.11 standard (which is sometimes referred to as 'Wi-Fi®') or Bluetooth® from the Bluetooth Special Interest Group of Kirkland, Wash.), and/or another type of wireless interface.

Wi-Fi communication protocols include channels with multiple sub-channels. In addition, Wi-Fi communication protocols allow multiple sub-channels to be aggregated into a single channel to increase the total bandwidth available during wireless communication with another electronic device (which is sometimes referred to as 'channel bonding'). Typically, there is a tradeoff between the number of sub-channels used during wireless communication and the allowed transmit power. In particular, regulatory constraints often restrict the transmit power during wireless communication. However, constraints on the transmit power can degrade the performance during the wireless communication, and can result in dropped packets and poor communication quality.

SUMMARY

The described embodiments relate to an electronic device that includes: an antenna, and an interface circuit that communicates, via the antenna, with another electronic device through a wireless local area network (WLAN). During operation, the electronic device receives one or more initial sub-channels in a set of sub-channels selected by the other electronic device. Then, the electronic device obtains one or more performance metrics associated with a link with the other electronic device, where the link has an initial total bandwidth and includes the one or more initial sub-channels. Moreover, the electronic device determines to modify the one or more initial sub-channels in response to comparing the one or more performance metrics to one or more modification criteria. Next, the electronic device modifies the one or more initial sub-channels by selecting, based on allowed transmit powers for the set of sub-channels, one or more first sub-channels in the set of sub-channels that differ from the one or more initial sub-channels.

Note that, when the other electronic device allows negotiation of sub-channels used in the link, the electronic device may communicate the modification to the link to the other electronic device so that the other electronic device uses the modification in subsequent communication with the electronic device. However, when the other electronic device excludes negotiation of sub-channels used in the link, the electronic device may use the modification to the link during subsequent data transmissions to the other electronic device.

Moreover, the one or more performance metrics may include: a received signal strength indicator from the other electronic device, a signal-to-noise ratio, a transmit packet error rate, a successful transmit data rate, and/or a successful receive data rate. The one or more performance metrics may be associated with communication via: the one or more initial sub-channels, the one or more first sub-channels, the one or more second sub-channels, and/or the one or more third sub-channels.

Furthermore, when the modification: increases the initial total bandwidth, the one or more first sub-channels may add to the one or more initial sub-channels; decreases the initial total bandwidth, the one or more first sub-channels may remove from the one or more initial sub-channels; and maintains the initial total bandwidth, the one or more first sub-channels may change at least a subset of the one or more initial sub-channels.

Additionally, when the one or more modification criteria indicate the increase in the initial total bandwidth, the one or more first sub-channels selected may have the highest allowed transmit powers among a group of first sub-channels in the set of sub-channels. However, when the one or more modification criteria indicate the decrease in the initial total bandwidth, the one or more second sub-channels selected may have highest allowed transmit powers among a group of second sub-channels in the set of sub-channels. Alternatively, when the one or more modification criteria indicate the initial total bandwidth is unchanged, the one or more third sub-channels selected may have the highest allowed transmit powers among a group of third sub-channels in the set of sub-channels.

In some embodiments, the one or more modification criteria specify a range of distances between the electronic device and the other electronic device.

Note that the electronic device may detect a sub-channel selection triggering event prior to obtaining the one or more performance metrics.

Moreover, the WLAN may include Wi-Fi network.

Furthermore, obtaining the one or more performance metrics may involve calculating a performance metric.

Additionally, the allowed transmit powers may be stored in a look-up table on the electronic device. The allowed transmit powers may be accessed in the look-up table based on information specifying a regulatory region in which the electronic device is located.

In some embodiments, the electronic device includes: a processor, and memory that stores a program module, which is executed by the processor. The program module may include instructions for at least some of the aforementioned operations performed by the electronic device.

Other embodiments provide a computer-program product for use with the electronic device. This computer-program product includes instructions for at least some of the aforementioned operations performed by the electronic device.

Other embodiments provide a second electronic device with an antenna and an interface circuit that, during operation, performs at least some of the aforementioned operations of the electronic device.

Other embodiments provide a method for determining the modification to the one or more initial sub-channels with the other electronic device, which may be performed by an embodiment of the electronic device.

This Summary is provided merely for purposes of illustrating some exemplary embodiments, so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

Figure 1:
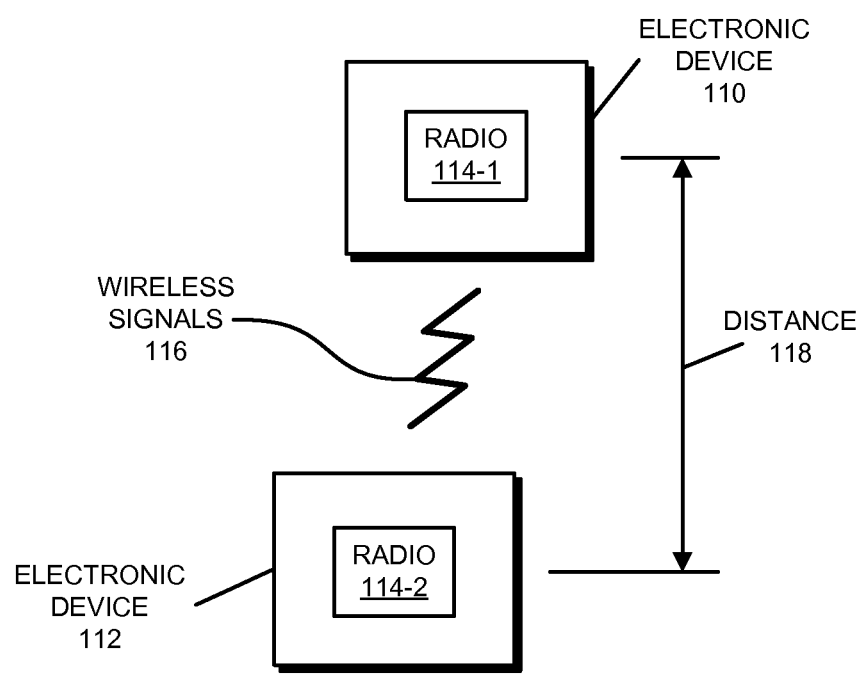
FIG. 1 is a block diagram illustrating example electronic devices wirelessly communicating.

Table 1 provides a list of channels or sub-channels and allowed transmit powers.

Note that like reference numerals refer to corresponding parts throughout the drawings. Moreover, multiple instances of the same part are designated by a common prefix separated from an instance number by a dash.

DETAILED DESCRIPTION

In order to improve the quality of communication between electronic devices, one or more sub-channels used during communication between the electronic devices are dynamically modified based on one or more performance metrics of the communication and allowed transmit powers of the sub-channels. When the one or more performance metrics indicate that a distance between the electronic devices falls within a mid-range of distances, the one or more performance metrics may be used to guide selective changes to the sub-channels used during the communication based on the allowed transmit powers. The changes to the sub-channels used during the communication may increase, decrease or maintain the total bandwidth. Moreover, by changing the sub-channels used during the communication, the allowed transmit power(s) of the sub-channel(s) used may be increased, which may improve the performance during the communication.

In this way, this communication technique may improve the quality of the communication between the electronic devices. For example, the communication technique may provide improved the throughput when the distance between the electronic devices is in the mid-range of distances. Consequently, the communication technique may reduce user frustration and, thus, may improve the user experience when using an electronic device.

In general, the information communicated between the electronic devices in the communication technique may be conveyed in packets or frames that are transmitted and received by radios in the electronic devices in accordance with a communication protocol, such as: an Institute of Electrical and Electronics Engineers (IEEE) 802.11 standard, Bluetooth® (from the Bluetooth Special Interest Group of Kirkland, Wash.), a cellular-telephone communication protocol, such as a 3GPP protocol e.g., Long Term Evolution, and/or another type of wireless interface. In the discussion that follows, Wi-Fi® is used as an illustrative example.

The communication between the electronic devices is shown in FIG. 1, which presents a block diagram illustrating example electronic devices 110 and 112 wirelessly communicating. In particular, these electronic devices may wirelessly communicate while: detecting one another by scanning wireless channels, transmitting and receiving beacons or beacon frames on wireless channels, establishing connections (for example, by transmitting connect requests), and/or transmitting and receiving packets or frames (which may include the request and/or additional information, such as data, as payloads).

Figure 8:
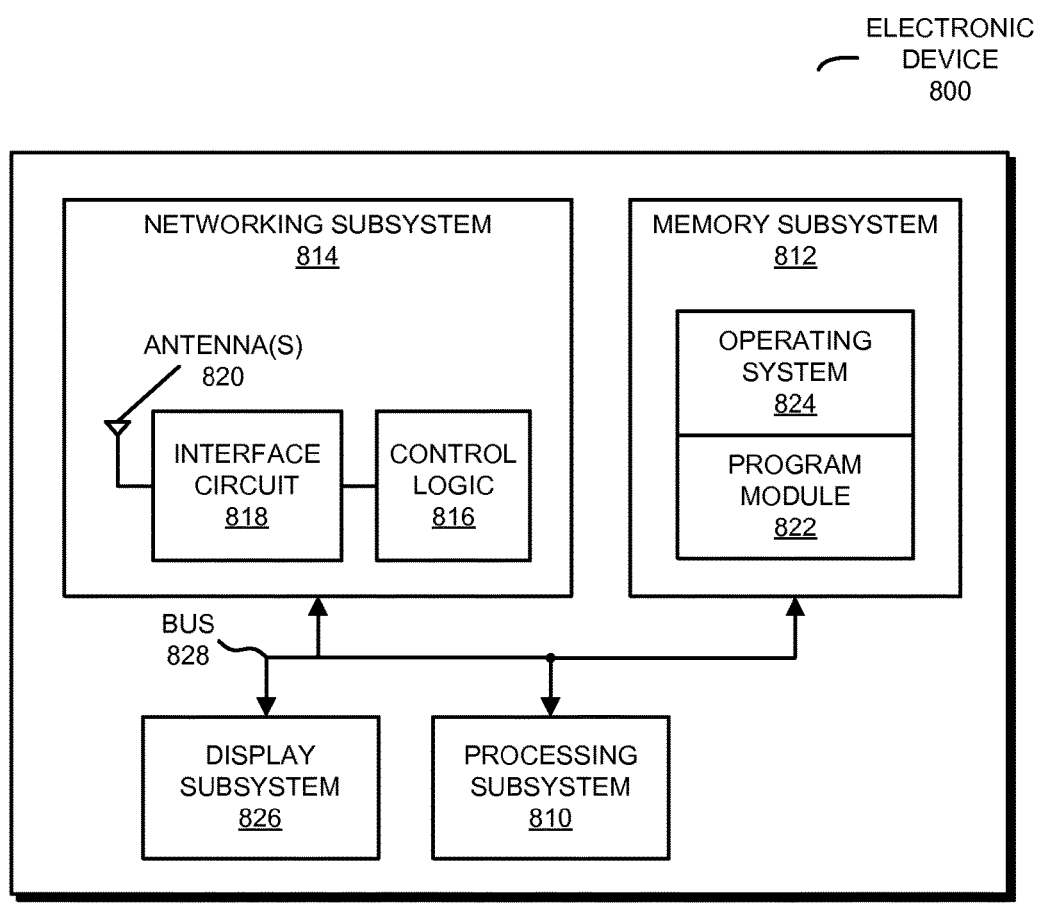
FIG. 8 is a block diagram illustrating an example of one of the electronic devices of FIG. 1.

As described further below with reference to FIG. 8, electronic devices 110 and 112 may include subsystems, such as a networking subsystem, a memory subsystem, and/or a processor subsystem. In addition, electronic devices 110 and 112 may include radios 114, e.g., in the networking subsystems. More generally, electronic devices 110 and 112 can include (or can be included within) any electronic devices with networking subsystems that enable either or both of electronic devices 110 and 112 to wirelessly communicate with other electronic devices. This can include transmitting beacons on wireless channels to enable electronic devices to make initial contact with or detect each other, followed by exchanging subsequent data/management frames (such as connect requests) to establish a connection (which is sometimes referred to as a 'Wi-Fi connection'), configure security options (e.g., IPSec), transmit and receive packets or frames via the connection, etc.

As can be seen in FIG. 1, wireless signals 116 (represented by a jagged line) are transmitted by a radio 114-1 in electronic device 110. These wireless signals 116 are received by radio 114-2 in electronic device 112. In particular, electronic device 110 (such as a cellular telephone) may transmit packets with information to electronic device 112 (such as an access point in a WLAN or a Wi-Fi network). Alternatively or additionally, electronic device 112 may transmit packets with information to electronic device 110. For example, electronic device 110 may transmit data to electronic device 112 using the WLAN. The performance of the communication (according to one or more measures, such as bandwidth) may be increased by aggregating one or more sub-channels or by using multiple sub-channels in a channel in a link between electronic devices 110 and 112.

However, as noted previously, there can be regulatory constraints on the allowed transmit power(s) used during the communication between electronic devices 110 and 112, e.g., specified in different regions. In particular, because of concerns about out-of-band emission (which can cause interference) and the specific absorption rate (which measures how the human body absorbs electromagnetic radiation), the allowed transmit powers of sub-channels at the band edge are typically constrained or limited, which can degrade the communication performance when multiple sub-channels are used in the link.

In order to address this problem, either or both of electronic devices 110 and 112 may dynamically select the sub-channels used during the communication. Using electronic device 110 as an illustration, electronic device 110 may change one or more of the sub-channels used during the communication to increase the allowed transmit power. This modification to the link between electronic devices 110 and 112 may improve the communication performance (such as the throughput) when a distance 118 between electronic devices 110 and 112 falls within a mid-range of distances, such as distances having pathloss between 75 and 95 dB. Moreover, the mid-range of distances may be identified based on one or more performance metrics that characterize the communication between electronic devices 110 and 112, including the link and/or communication via one or more of the sub-channels.

In particular, as described further below with reference to FIGS. 2-7, electronic device 110 may obtain the one or more performance metrics that characterize the communication between electronic devices 110 and 112. For example, the one or more performance metrics may be received from electronic device 112 and/or may be calculated by electronic device 110. In general, a wide variety of performance metrics may be used, including: a received signal strength indicator (RSSI) from electronic device 112, a signal-to-noise ratio (SNR), a transmit packet error rate, a beacon error rate, a successful transmit data rate (which is sometimes referred to as a 'throughput'), a request-to-send (RTS) failure rate, a successful receive data rate, a successful Transmission Control Protocol (TCP) connection rate and/or a performance metric that (directly or indirectly) characterizes a quality of the communication between electronic devices 110 and 112. Note that the one or more performance metrics may include: an instantaneous value of a performance metric, and/or an average value of the performance metric. In particular, the average value may be determined using a low-pass filter, averaging of multiple measurements and/or systematic under-relaxation (e.g., $y(i)=\alpha \times \Delta y+(1-\alpha) \cdot y(i-1)$, where $\alpha$ is a convergence factor such as 0.1 or 0.16). Furthermore, a given performance metric may characterize the communication in a particular sub-channel or in multiple sub-channels.

Then, electronic device 110 may compare the one or more performance metrics with one or more modification criteria to determine whether to determine a modification to the sub-channel(s) in the link. For example, when the RSSI is less than −75 dBm and greater than −90 dBm, electronic device 110 may determine the modification to the sub-channel(s) in the link. In particular, if the communication currently involves a channel with four 20 MHz sub-channels (i.e., an initial total bandwidth of 80 MHz), electronic device 110 may select one of two available 40 MHz sub-channels (which each include two 20 MHz sub-channels). Alternatively, if the communication currently involves a channel with two 20 MHz sub-channels (i.e., an initial total bandwidth of 40 MHz), electronic device 110 may select one of four available 20 MHz sub-channels. The selected sub-channel(s) may have the highest allowed transmit power(s). Note that the allowed transmit powers for the sub-channels (which are a function of the performance of radio 114-1 and the antenna in electronic device 110, as well as the regulations in a region where electronic device 110 is located and/or operated) may be stored in a computer-readable memory in electronic device 110 (such as in SRAM). The allowed transmit power(s) may be accessed based on region information that specifies the region in which electronic device 110 is located and/or operated. For example, the region information may be obtained by electronic device 110 on a one-time basis (such as when electronic device 110 is turned on), periodically (such as every 1, 5 or 10 min) or as needed from: a cellular-telephone network, a local positioning system, a Global positioning system, etc.

While the preceding example illustrated electronic device 110 decreasing the initial total bandwidth, in general the changes to the sub-channel(s) used during the communication may increase the total bandwidth, decrease the total bandwidth, or leave the total bandwidth unchanged. Moreover, the one or more modification criteria may include, e.g., a transmit packet error rate corresponding to 7 of 10 consecutive packets without an acknowledgment or within a time interval (such as 1, 5 or 10 s), a throughput between 50 and 150 Mbps, and/or an SNR between 3 and 12 dB. In other implementations, the upper and/or lower bound of any range may be changed and any other suitable measure(s) may be used as modification criteria in addition to or in place of those mentioned here.

If electronic device 112 allows negotiation of the sub-channels used in the link, electronic device 110 may communicate the modification to the link (i.e., the selected sub-channel(s)) to electronic device 112 so that electronic device 112 can use the modification to the link in subsequent communication with electronic device 110. For example, if electronic devices 110 and 112 include the same interface circuit (e.g., from a common provider or manufacturer), then electronic device 112 may support negotiated changes in the primary channel(s) used during communication with electronic device 110.

However, in some embodiments, electronic device 112 does not support or excludes negotiation of the sub-channels used in the link. In these embodiments, electronic device 110 may use the modification to the link (i.e., the selected sub-channel(s)) during subsequent data transmissions to electronic device 112. Thus, even when electronic device 110 cannot change the sub-channel(s) used by electronic device 112 when electronic device transmits to electronic device 110, electronic device 110 can respond using the selected sub-channel(s), which may allow electronic device 110 to increase the allowed transmit power.

In the described embodiments, processing a packet or frame in either of electronic devices 110 and 112 includes: receiving wireless signals 116 with carrying or conveying the packet or frame; decoding/extracting the packet or frame from received wireless signals 116 to acquire the packet or frame; and processing the packet or frame to determine information contained in the packet or frame (such as the request or additional information in the payload).

Although we describe the network environment shown in FIG. 1 as an example, in alternative embodiments, different numbers or types of electronic devices may be present. For example, some embodiments can include more or fewer electronic devices. As another example, in other embodiments, different electronic devices are transmitting and/or receiving packets or frames.

Figure 2:
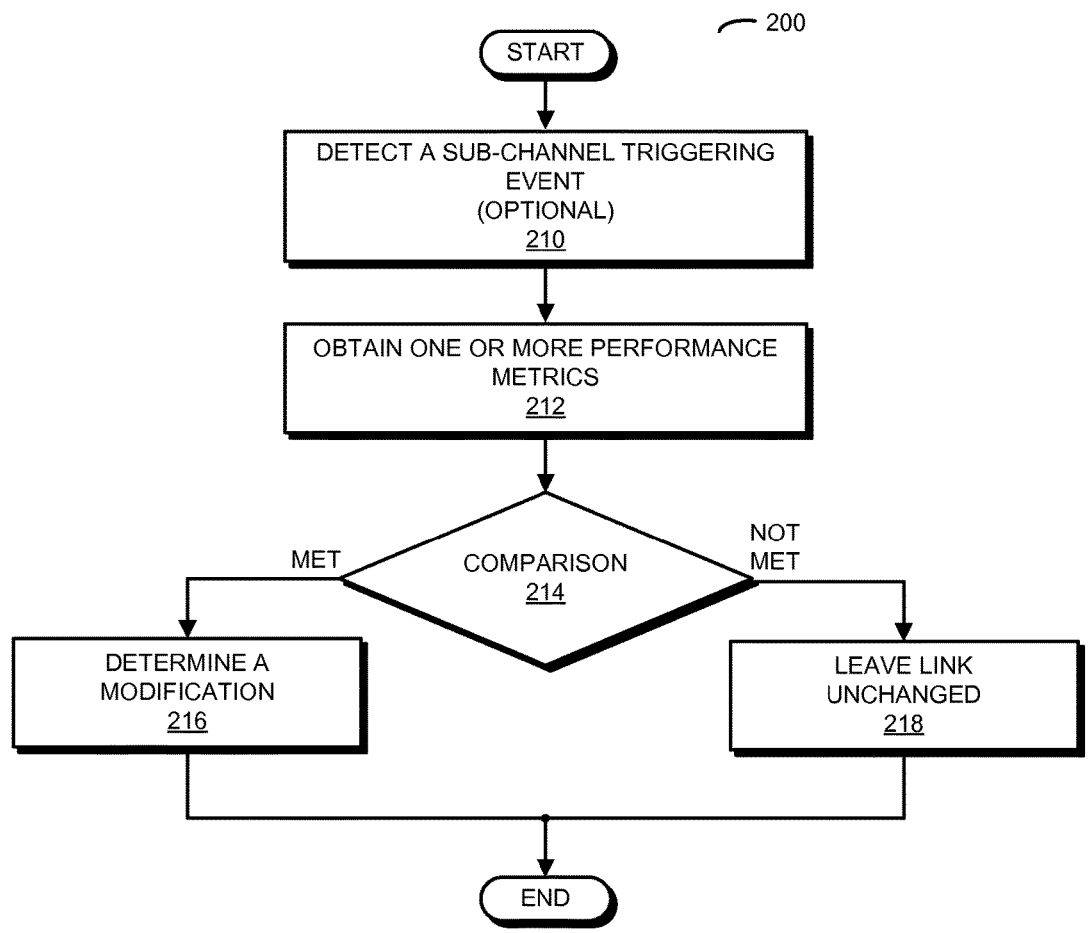
FIG. 2 is a flow diagram illustrating an example method for determining a modification to one or more initial sub-channels in a link between electronic devices, e.g., in FIG. 1.

We now describe embodiments of an example method. FIG. 2 presents a flow diagram illustrating method 200 for determining a modification to one or more initial sub-channels in a link between electronic devices, e.g., the devices in FIG. 1, which may be performed by an electronic device (such as electronic device 110 in FIG. 1). During operation, the electronic device obtains one or more performance metrics (operation 212) associated with a link with another electronic device, where the link has an initial total bandwidth and includes one or more initial sub-channels in a set of sub-channels. Note that the one or more performance metrics may be associated with communication via: the one or more initial sub-channels, one or more first sub-channels, one or more second sub-channels, and/or one or more third sub-channels. Thus, a given performance metric may characterize or may be associated with the communication via a particular sub-channel (i.e., the one or more performance metrics may be on a sub-channel by sub-channel basis) or multiple sub-channels. For example, the one or more performance metrics may include RSSI values for sub-channels in the set of sub-channels.

Then, the electronic device compares (operation 214) the one or more performance metrics to one or more modification criteria. For example, the one or more modification criteria may include RSSI values of −75 and −95 dBm. Thus, when the average RSSI for the link is between −75 and −95 dBm, the one or more modification criteria may be met.

When the one or more modification criteria are met (operation 214), the electronic device determines a modification (operation 216) to the one or more initial sub-channels. In particular, when the one or more modification criteria indicate an increase in the initial total bandwidth (such as when the RSSI for the link is between −75 and −95 dBm), the modification includes additionally selecting, based on allowed transmit powers associated with sub-channels in the set of sub-channels, the one or more first sub-channels in the set of sub-channels that are different than the one or more initial sub-channels. For example, the one or more first sub-channels selected may have the highest allowed transmit powers among a group of first sub-channels in the set of sub-channels. Note that a given one of the one or more first sub-channels may have the same or a larger sub-channel bandwidth than that of the one or more initial sub-channels.

Alternatively, when the one or more modification criteria indicate a decrease in the initial total bandwidth, the modification includes selecting, based on the allowed transmit powers: a subset of the one or more initial sub-channels and/or the one or more second sub-channels in the set of sub-channels that are different than the one or more initial sub-channels. For example, the one or more second sub-channels selected may have the highest allowed transmit powers among a group of second sub-channels in the set of sub-channels. Note that a given one of the one or more second sub-channels may have a smaller sub-channel bandwidth than that of the one or more initial sub-channels.

Moreover, when the one or more modification criteria indicate the initial total bandwidth is unchanged, the modification includes selecting, based on the allowed transmit powers, the one or more third sub-channels in the set of sub-channels that are different than the one or more initial sub-channels and that have the same sub-channel bandwidths as the one or more initial sub-channels. For example, the one or more third sub-channels selected may have highest allowed transmit powers among a group of third sub-channels in the set of sub-channels.

Otherwise (operation 214), the electronic device leaves the link unchanged (operation 218).

When the other electronic device allows negotiation of sub-channels used in the link, the electronic device may communicate the modification to the link to the other electronic device so that the other electronic device uses the modification in subsequent communication with the electronic device. However, when the other electronic device excludes negotiation of sub-channels used in the link, the electronic device may use the modification to the link during subsequent data transmissions to the other electronic device. Thus, the electronic device may use the selected sub-channel (s) even if the other electronic device continues to use other sub-channels (such as the one or more initial sub-channel (s)).

In some embodiments, the electronic device optionally detects a sub-channel selection triggering event (operation 210) prior to obtaining the one or more performance metrics (operation 212). For example, the sub-channel selection triggering event may include: initial or dynamic access-point channel setup, and/or when the one or more performance metrics indicate that the bandwidth needs to be changed (such as when the RSSI is between −75 and −95 dBm, when a packet-error-rate counter exceeds a threshold, when interference is detected in a sub-channel while using an 80 MHz channel, etc.).

In an exemplary embodiment, at least some of the operations in method 200 are performed by a program module that is executed in an environment (such as the operating system) of the electronic device. Alternatively, at least some of the operations in method 200 may be performed by an interface circuit in the electronic device. For example, at least some of the operations may be performed by firmware executed by the interface circuit.

Figure 3:
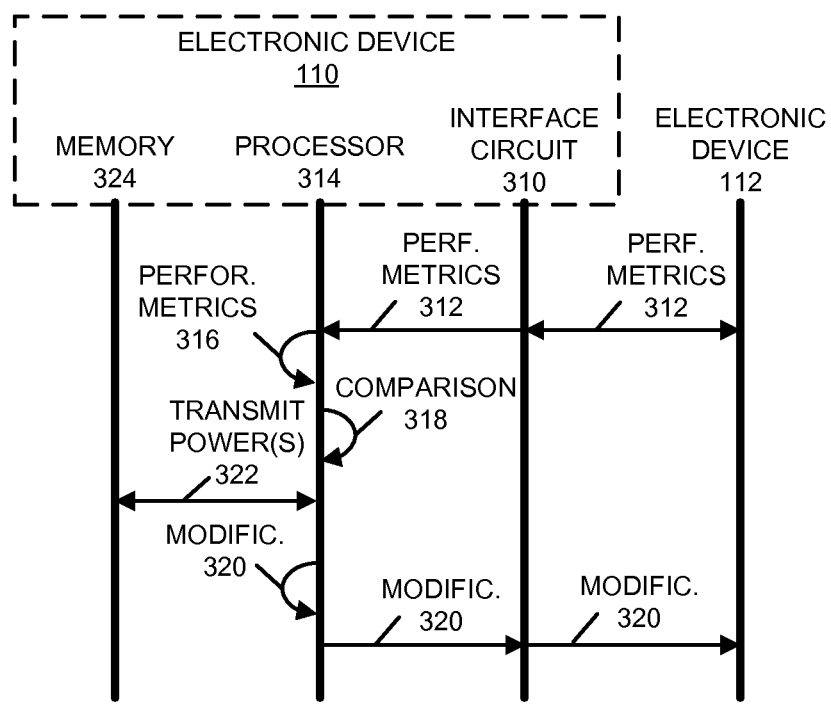
FIG. 3 is a drawing illustrating example communication between the electronic devices, e.g., of FIG. 1.

The communication technique is further illustrated in FIG. 3, which presents a drawing illustrating communication between electronic devices 110 and 112 (FIG. 1). Interface circuit 310, e.g., in electronic device 110, receives one or more performance metrics 312 from another device, e.g., electronic device 112, which are associated with communication between electronic devices, e.g., electronic devices 110 and 112. In addition, processor 314 may determine one or more performance metrics 316 based on information associated with the communication between electronic devices. As noted previously, processor 314 may execute a program module and/or an operating system. Alternatively, processor 314 may execute firmware (e.g., processor 314 may be included in interface circuit 310).

Then, processor 314 may compare 318 performance metrics 312 and/or 316 with one or more modification criteria. Based on comparison 318, processor 314 may determine a modification 320 to sub-channel(s) used in communication with another electronic device. For example, modification 320 may increase, decrease or leave unchanged the total bandwidth used in the communication with another electronic device. Moreover, the sub-channel(s) selected by processor 314 may be based on allowed transmit power(s) 322 of the sub-channels, which are stored in memory 324 and which are accessed by processor 314 in order to determine modification 320. Otherwise, if comparison 318 indicates that modification 320 should not be made, processor 314 may leave unchanged the sub-channels used during communication with the other electronic device.

Processor 312 may communicate modification 320 to interface circuit 310. If the other electronic device, e.g., electronic device 112, allows negotiation of the sub-channels used during transmissions, interface circuit 310 may optionally communicate the determined modification 320 to the other electronic device, e.g., electronic device 112. Alternatively or additionally, interface circuit 310 may use the sub-channel(s) specified in modification 320 when transmitting, e.g., to electronic device 112.

In these ways, the electronic device may facilitate reliable and high-quality communication between the electronic devices. In particular, there may be fewer dropped packets and, more generally, improved communication performance because the allowed transmit power of the selected sub-channel(s) used during the communication may be increased.

In an exemplary embodiment, the communication between the electronic device and the other electronic device is performed using Wi-Fi. Moreover, the communication may use an 80 MHz channel with two 40 MHz sub-channels, or four 20 MHz sub-channels. (However, other bandwidth configurations may be employed in other embodiments, e.g., the communication may use a 160 MHz channel with two 80 MHz sub-channels, four 40 MHz sub-channels, or eight 20 MHz sub-channels.) When determining the modification (which is sometimes referred to as 'rate adaptation'), the electronic device may fall back from 80 MHz to a 40 MHz sub-channel or a 20 MHz sub-channel. For example, the modification may be determined when the distance between the electronic device and the other electronic device falls within a mid-to-far range, which may be determined based on metrics such as the pathloss and/or the RSSI.

As noted previously, the allowed transmit powers for different sub-channels can be very different in various regulatory regions. For example, the allowed transmit powers for band-edge sub-channels may be restricted because of regulatory rules. Consequently, the primary channels used or selected by the other electronic device may not have the highest allowed transmit power. Because the wireless baseline performance (without co-channel interference from other nearby networks) at mid-to-far range of distances is often client transmit-power limited, the constraints on the allowed transmit power can adversely impact communication performance. Therefore, selecting or operating on the right sub-channel with the highest allowed transmit power may improve the communication performance in the mid-to-far range of distances.

For example, in the United States, a laptop computer may communicate with an access point using channel 62 with an 80 MHz bandwidth. Table 1 provides an example list of channels or sub-channels and corresponding allowed transmit powers (and, in particular, the allowed transmit powers for the sub-channels in channel 62). At the mid-to-far range of distance (such as RSSI between 75 and 95 dBm, e.g., around 80 dBm), the laptop computer may use channel 62 with a 40 MHz bandwidth and then channel 60 with a 20 MHz bandwidth as the primary sub-channels for transmission. However, because of the allowed transmit powers, these sub-channel choices may not provide optimal wireless communication performance.

TABLE 1

| Channel or Sub-Channel | Bandwidth (MHz) | Transmit Power (dBm) |
|---|---|---|
| 42 | 80 | 8 |
| 54 | 40 | 16.5 |
| 56 | 20 | 15.5 |
| 60 | 20 | 15.5 |
| 62 | 40 | 11.5 |

Instead, based on the allowed transmit powers of the sub-channels, in the mid-to-far range of distances in the communication technique the laptop computer may negotiate with the access point to select channel 54 with a 40 MHz bandwidth and then channel 60 with a 20 MHz bandwidth or channel 56 with a 20 MHz bandwidth as the primary sub-channels. For example, when the RSSI is greater than −75 dBm, the laptop computer may use an 80 MHz bandwidth. When the RSSI is between −75 and −85 dBm, the laptop computer may use a 40 MHz bandwidth. And when the RSSI is less than −95 dBm, the laptop computer may use a 20 MHz bandwidth. These selections may result in more than a 50% increase in throughput (such as from 50 to 100 Mbps or 100 Mbps to 150 Mbps).

Figure 4:
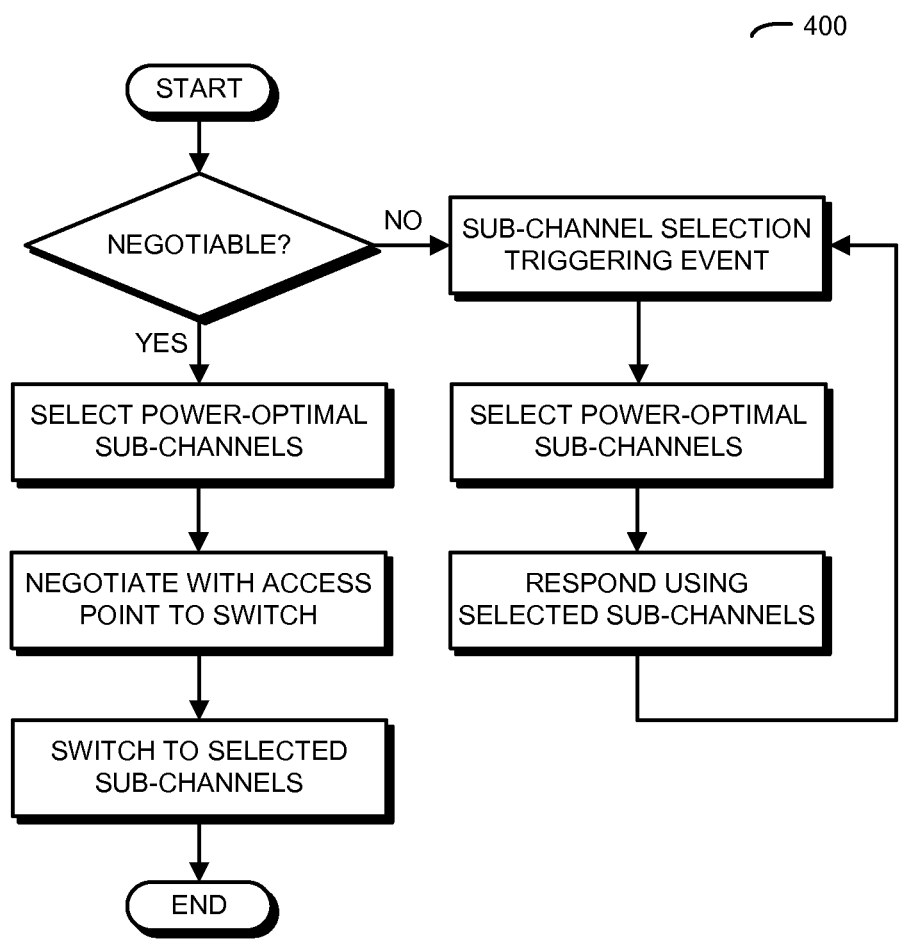
FIG. 4 is a flow diagram illustrating an example method for determining a modification to one or more initial sub-channels in a link between electronic devices, e.g., in FIG. 1.

FIG. 4 presents a flow diagram illustrating an example method 400 for determining a modification to one or more initial sub-channels in a link, e.g., between electronic devices, e.g., the electronic devices in FIG. 1. During operation, if the second electronic device (such as an access point) permits negotiating (410) the primary channel, the first electronic device may select one or more sub-channels (412), e.g., based on optimal or preferred power. Then, the first electronic device may negotiate with the second electronic device to switch to the selected one or more sub-channel(s) as the primary channel (414), and the primary channel may then be switched (416) to the selected one or more sub-channel(s) (i.e., the selected one or more sub-channel(s) may be used during subsequent communications). Alternatively, when the second electronic device does not permit negotiating the primary channel (410) and when there is a sub-channel selection triggering event (418) (such as initial or dynamic access-point channel setup and/or when the one or more performance metrics indicate that the bandwidth needs to be changed), the first electronic device may select one or more sub-channels (420), e.g., based on optimal or preferred power, and the first electronic device may respond (422) to the second electronic device using the selected one or more sub-channel(s) for transmission.

Figure 5:
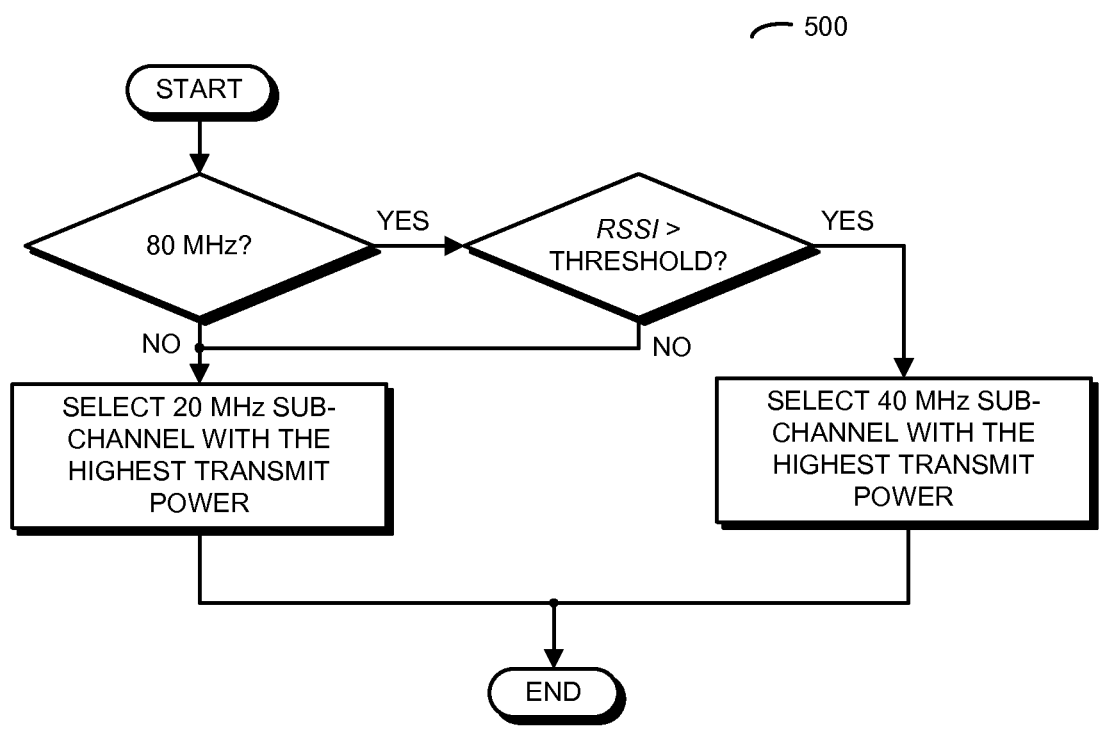
FIG. 5 is a flow diagram illustrating an example method for selecting one or more sub-channels, e.g., in the method of FIG. 4.

FIG. 5 presents an example method 500 for selecting the one or more sub-channels in method 400 (FIG. 4), which may be performed by an electronic device (such as electronic device 110 in FIG. 1). When selecting the one or more sub-channels, the electronic device may determine if the primary channel has a bandwidth of 80 MHz (510). If yes, the electronic device may determine if the RSSI is greater than a threshold (512) (such as −85 dBm or the RSSI value corresponding to 90 dB pathloss). If yes, the electronic device may select a sub-channel (514) having a 40 MHz bandwidth, e.g., with the highest allowed transmit power (however, another sub-channel may be selected, e.g., if there is interference). If the RSSI is not greater than a threshold (512), the electronic device may select a sub-channel (516) having a 20 MHz bandwidth, e.g., with the highest allowed transmit power. Alternatively, if the primary channel does not have a bandwidth of 80 MHz (510), the electronic device may select a sub-channel (516) having a 20 MHz bandwidth, e.g., with the highest allowed transmit power.

Figure 6:
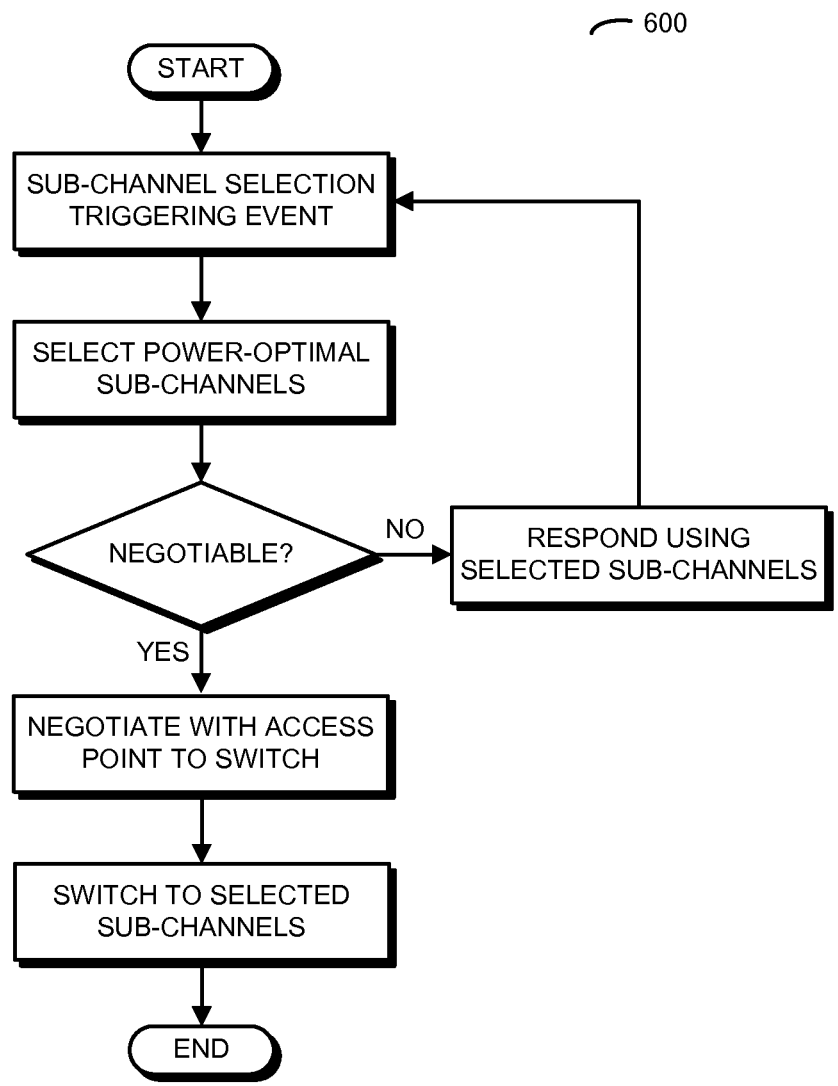
FIG. 6 is a flow diagram illustrating an example method for determining a modification to one or more initial sub-channels in a link between electronic devices, e.g., in FIG. 1.

FIG. 6 presents a flow diagram illustrating an example method 600 for determining a modification to one or more initial sub-channels in a link between electronics, e.g., the electronic devices in FIG. 1. During operation, if there is a sub-channel selection triggering event (610), the first electronic device may select (612) one or more sub-channels, e.g., based on optimal or preferred power. If the second electronic device (such as an access point) permits negotiating (614) the primary channel, the first electronic device may negotiate with the second electronic device to switch (616) to the selected one or more sub-channel(s) as the primary channel, and the primary channel may then be switched (618) to the selected one or more sub-channel(s) (i.e., the selected one or more sub-channel(s) may be used during subsequent communications). However, if the second electronic device does not permit negotiating (614) the primary channel, the first electronic device may respond (620) to the second electronic device using the selected one or more sub-channel(s) for transmission.

Figure 7:
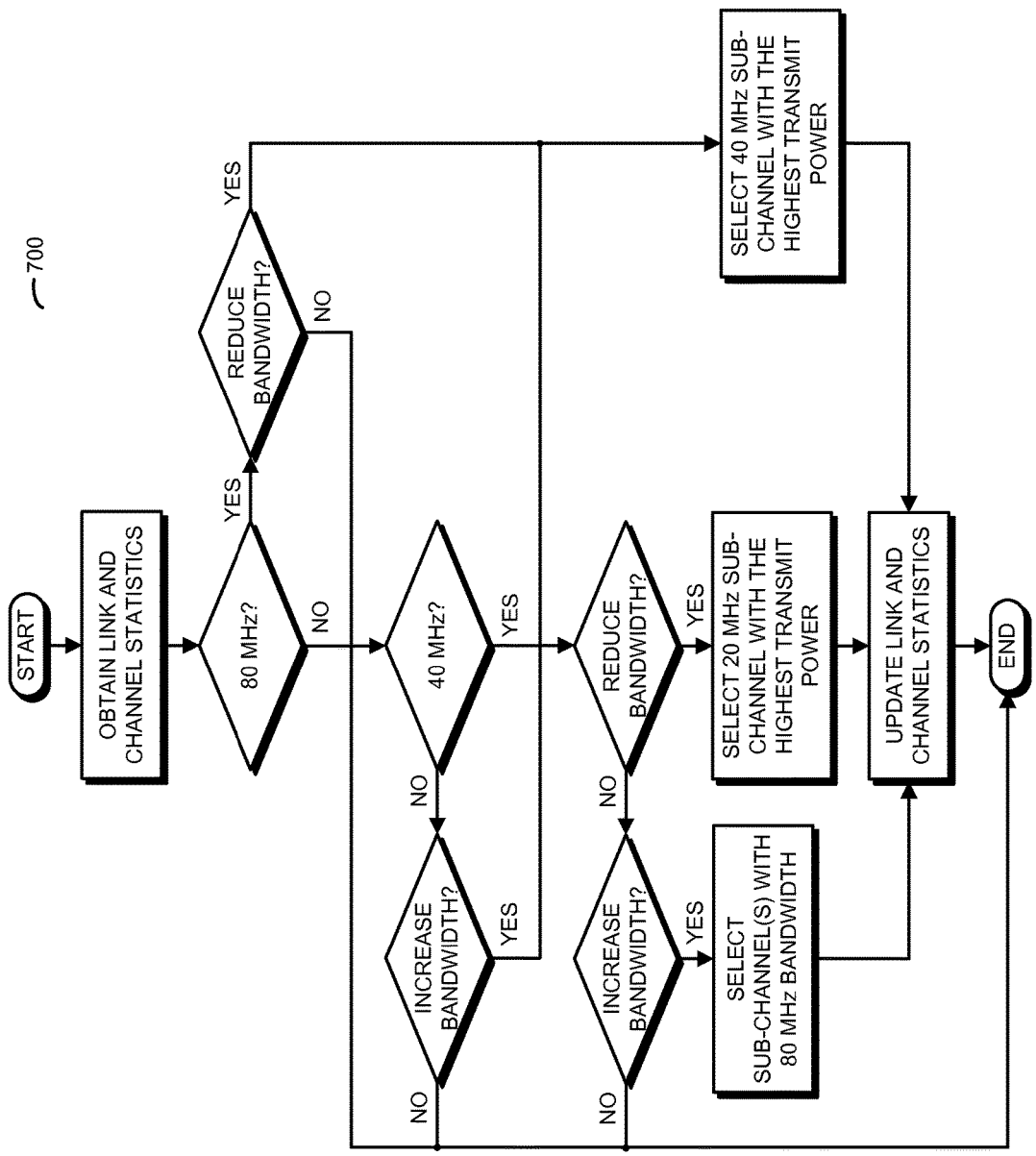
FIG. 7 is a flow diagram illustrating an example method for selecting one or more sub-channels, e.g., in the method of FIG. 6.

FIG. 7 presents an example method 700 for selecting the one or more sub-channels in method 600 (FIG. 6), which may be performed by an electronic device (such as electronic device 110 in FIG. 1). In particular, when selecting the one or more sub-channels, e.g., power-optimal sub-channels, the electronic device may determine (710) link and/or channel statistics (such as the RSSI, the packet error rate, the data rate and, more generally, one or more performance metrics). Then, the electronic device may determine if the primary channel presently has a total bandwidth of 80 MHz (712). If yes (712), the electronic device may determine (714) if the link and/or channel statistics indicate that the bandwidth should be reduced (such as when the RSSI is less than −75 dBm). If the bandwidth should be reduced (714), the electronic device can select (716) one or more sub-channel(s) having a 40 MHz total bandwidth, e.g., with the highest allowed transmit power, and may update the link and/or channel statistics (718). If the bandwidth should not be reduced (714), the electronic device may leave the sub-channel(s) unchanged.

Alternatively, if the primary channel does not have a bandwidth of 80 MHz (712), the electronic device may determine if the primary channel has a bandwidth of 40 MHz (720). If yes, the electronic device may determine (722) if the link and/or channel statistics indicate that the bandwidth should be reduced (which may be based on the same of different criteria as in operation 714, e.g., the RSSI is less than −95 dBm). If the bandwidth should be reduced (722), the electronic device may select (724) a sub-channel having a 20 MHz bandwidth, e.g., with the highest allowed transmit power, and may update the link and/or channel statistics (718). If the bandwidth should not be reduced (722), the electronic device may determine (726) if the link and/or channel statistics indicate that the bandwidth should be increased (which may be based on the same of different criteria as in operations 714 and/or 722, e.g., the RSSI is greater than −75 dBm). If the bandwidth should be increased (726), the electronic device may select (728) one or more sub-channel(s) so that the total bandwidth is 80 MHz, and may update the link and/or channel statistics (718). Otherwise, the electronic device may leave the sub-channel(s) unchanged.

Furthermore, if the primary channel currently does not have a bandwidth of 80 MHz or 40 MHz (i.e., the bandwidth is 20 MHz), the electronic device may determine (730) if the link and/or channel statistics indicate that the bandwidth should be increased (which may be based on the same or different criteria as in operations 714, 722 and/or 726, e.g., the RSSI is greater than −75 dBm or the RSSI is between −75 and −95 dBm). If the bandwidth should be increased (730), the electronic device may select (716) one or more sub-channel(s) having a 40 MHz total bandwidth, e.g., with the highest allowed transmit power, and may update the link and channel statistics (718). If the bandwidth should not be increased (730), the electronic device may leave the sub-channel(s) unchanged.

Note that while an access point was used in the preceding examples, the communication technique can apply to infrastructure and/or ad-hoc (peer-to-peer) mode networks (i.e., the other electronic device may be another type of electronic device than an access point). Further, in this and preceding examples, bandwidths of 20 MHz, 40 MHz, and 80 MHz were presented. In other implementations, other bandwidths can be used, such as 20/40/80/160 MHz.

In some embodiments of the preceding methods, there may be additional or fewer operations. Moreover, the order of the operations may be changed, and/or two or more operations may be combined into a single operation.

Note that the bandwidths and thresholds (or modification criteria) in the preceding examples are only for purposes of illustration, and other bandwidths and/or thresholds may be used.

We now describe embodiments of the electronic device. FIG. 8 presents a block diagram illustrating an electronic device 800, such as electronic device 110 in FIG. 1. This electronic device includes processing subsystem 810, memory subsystem 812, and networking subsystem 814. Processing subsystem 810 includes one or more devices configured to perform computational operations. For example, processing subsystem 810 can include one or more microprocessors, application-specific integrated circuits (ASICs), microcontrollers, programmable-logic devices, and/or one or more digital signal processors (DSPs).

Memory subsystem 812 includes one or more devices for storing data and/or instructions for processing subsystem 810 and networking subsystem 814. For example, memory subsystem 812 can include dynamic random access memory (DRAM), static random access memory (SRAM), and/or other types of memory. In some embodiments, instructions for processing subsystem 810 in memory subsystem 812 include: one or more program modules or sets of instructions (such as program module 822 or operating system 824), which may be executed by processing subsystem 810. Note that the one or more computer programs may constitute a computer-program mechanism. Moreover, instructions in the various modules in memory subsystem 812 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 810.

In addition, memory subsystem 812 can include mechanisms for controlling access to the memory. In some embodiments, memory subsystem 812 includes a memory hierarchy that comprises one or more caches coupled to a memory in electronic device 800. In some of these embodiments, one or more of the caches is located in processing subsystem 810.

In some embodiments, memory subsystem 812 is coupled to one or more high-capacity mass-storage devices (not shown). For example, memory subsystem 812 can be coupled to a magnetic or optical drive, a solid-state drive, or another type of mass-storage device. In these embodiments, memory subsystem 812 can be used by electronic device 800 as fast-access storage for often-used data, while the mass-storage device is used to store less frequently used data.

Networking subsystem 814 includes one or more devices configured to couple to and communicate on a wired and/or wireless network (i.e., to perform network operations), including: control logic 816, an interface circuit 818 and one or more antennas 820. For example, networking subsystem 814 can include a Bluetooth networking system, a cellular networking system (e.g., an 3G/4G network such as UMTS, LTE, etc.), a universal serial bus (USB) networking system, a networking system based on the standards described in IEEE 802.11 (e.g., a Wi-Fi networking system), an Ethernet networking system, and/or another networking system.

Networking subsystem 814 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' between the electronic devices does not yet exist. Therefore, electronic device 800 may use the mechanisms in networking subsystem 814 for performing simple wireless communication between the electronic devices, e.g., transmitting advertising or beacon frames and/or scanning for advertising frames transmitted by other electronic devices.

Within electronic device 800, processing subsystem 810, memory subsystem 812, and networking subsystem 814 are coupled together using bus 828. Bus 828 may include an electrical, optical, and/or electro-optical connection that the subsystems can use to communicate commands and data among one another. Although only one bus 828 is shown for clarity, different embodiments can include a different number or configuration of electrical, optical, and/or electro-optical connections between the subsystems.

In some embodiments, electronic device 800 includes a display subsystem 826 for displaying information on a display, which may include a display driver and the display, such as a liquid-crystal display, a multi-touch touchscreen, etc.

Electronic device 800 can be (or can be included in) any electronic device with at least one network interface. For example, electronic device 800 can be (or can be included in): a desktop computer, a laptop computer, a server, a media player (such as an MP3 player), an appliance, a subnotebook/netbook, a tablet computer, a smartphone, a cellular telephone, a piece of testing equipment, a network appliance, a set-top box, a personal digital assistant (PDA), a toy, a controller, a digital signal processor, a game console, a computational engine within an appliance, a consumer-electronic device, a portable computing device, a personal organizer, a sensor, a user-interface device and/or another electronic device.

Although specific components are used to describe electronic device 800, in alternative embodiments, different components and/or subsystems may be present in electronic device 800. For example, electronic device 800 may include one or more additional processing subsystems 810, memory subsystems 812, networking subsystems 814, and/or display subsystems 826. Additionally, one or more of the subsystems may not be present in electronic device 800. Moreover, in some embodiments, electronic device 800 may include one or more additional subsystems that are not shown in FIG. 8. For example, electronic device 800 can include, but is not limited to, a data collection subsystem, an audio and/or video subsystem, an alarm subsystem, a media processing subsystem, and/or an input/output (I/O) subsystem. Also, although separate subsystems are shown in FIG. 8, in some embodiments, some or all of a given subsystem or component can be integrated into one or more of the other subsystems or component(s) in electronic device 800. For example, in some embodiments program module 822 is included in operating system 824.

Moreover, the circuits and components in electronic device 800 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit may implement some or all of the functionality of networking subsystem 814, such as a radio. Moreover, the integrated circuit may include hardware and/or software mechanisms that are used for transmitting wireless signals from electronic device 800 and receiving signals at electronic device 800 from other electronic devices. Aside from the mechanisms herein described, radios are generally known in the art and hence are not described in detail. In general, networking subsystem 814 and/or the integrated circuit can include any number of radios. Note that the radios in multiple-radio embodiments function in a similar way to the described single-radio embodiments.

In some embodiments, networking subsystem 814 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals, e.g., determining if the received signal comprises an advertising frame, etc.)

While a communication protocol compatible with Wi-Fi standards was used as an illustrative example, the described embodiments of the communication technique may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication technique may be implemented using program module 822, operating system 824 (such as a driver for interface circuit 818) or in firmware in interface circuit 818. Alternatively or additionally, at least some of the operations in the communication technique may be implemented in a physical layer, such as hardware in interface circuit 818.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An electronic device, comprising:
an antenna;
an interface circuit coupled to the antenna configured to communicate over a link with another electronic device through a wireless local area network (WLAN); and
a processor configured to:
receive, from the other electronic device, information identifying one or more initial sub-channels in a set of sub-channels selected by the other electronic device;
detect a sub-channel selection triggering event;
obtain, based at least in part on the detected sub-channel selection triggering event, one or more performance metrics associated with the link with the other electronic device, wherein the link with the other electronic device has an initial total bandwidth and comprises the one or more initial sub-channels; and
in response to a determination that the other electronic device permits negotiation, perform the negotiation to modify the one or more initial sub-channels in response to comparing the one or more performance metrics to one or more modification criteria and based at least in part on a set of allowed transmit powers corresponding to the set of sub-channels; and
select one or more first sub-channels in the set of sub-channels that differ from the one or more initial sub-channels based at least in part on the negotiation.

2. The electronic device of claim 1, wherein, in response to the determination that the other electronic device permits the negotiation, the processor is further configured to communicate the one or more first sub-channels to the other electronic device so that the other electronic device uses the one or more first sub-channels in a subsequent communication with the electronic device.

3. The electronic device of claim 1, wherein, in response to a determination that the other electronic device does not permit the negotiation of sub-channels used in the link with the other electronic device, the processor is further configured to use the one or more first sub-channels during subsequent data transmissions to the other electronic device.

4. The electronic device of claim 1, wherein the one or more performance metrics include one or more of: a received signal strength indicator from the other electronic device, a signal-to-noise ratio, a transmit packet error rate, a successful transmit data rate, and a successful receive data rate; and
wherein the one or more performance metrics are associated with communication via one of: the one or more initial sub-channels, the one or more first sub-channels, one or more second sub-channels, and one or more third sub-channels.

5. The electronic device of claim 1, wherein, in response to the one or more first sub-channels increasing the initial total bandwidth, the one or more first sub-channels are added to the one or more initial sub-channels;
wherein, in response to the one or more first sub-channels decreasing the initial total bandwidth, the one or more first sub-channels are removed from the one or more initial sub-channels; and
wherein, in response to the one or more first sub-channels maintaining the initial total bandwidth, the one or more first sub-channels change at least a subset of the one or more initial sub-channels.

6. The electronic device of claim 1, wherein the processor is further configured to:
in response to the one or more first sub-channels increasing the initial total bandwidth, select the one or more first sub-channels that have highest allowed transmit powers among a group of first sub-channels in the set of sub-channels;
in response to the one or more first sub-channels decreasing the initial total bandwidth, select one or more second sub-channels that have highest allowed transmit powers among a group of second sub-channels in the set of sub-channels; and
in response to the one or more first sub-channels maintaining the initial total bandwidth, select one or more third sub-channels that have highest allowed transmit powers among a group of third sub-channels in the set of sub-channels.

7. The electronic device of claim 1, wherein the one or more modification criteria specify a range of distances between the electronic device and the other electronic device.

8. The electronic device of claim 1, wherein the allowed transmit powers are stored in a look-up table on the electronic device; and
wherein the allowed transmit powers are accessed in the look-up table based at least in part on information specifying a regulatory region in which the electronic device is located.

9. The electronic device of claim 1, wherein the interface circuit is further configured to communicate over the link with the other electronic device using a channel that includes the set of sub-channels.

10. The electronic device of claim 9, wherein the processor is further configured to:
determine that the channel has the initial total bandwidth; and
in response to the channel having the initial total bandwidth and based at least in part on the one or more performance metrics, selecting the one or more first sub-channels having second total bandwidth, wherein the second total bandwidth is less than the initial total bandwidth.

11. The electronic device of claim 1, wherein the set of allowed transmit powers varies for the selected one or more first sub-channels.

12. An electronic device, comprising:
an antenna;
an interface circuit coupled to the antenna configured to communicate over a link with another electronic device through a wireless local area network (WLAN);
a processor; and
memory that stores a program module, wherein the program module is executed by the processor and has instructions that when executed cause the processor to:
receive, from the other electronic device, information identifying one or more initial sub-channels in a set of sub-channels selected by the other electronic device;
obtain one or more performance metrics associated with the link with the other electronic device, wherein the link with the other electronic device has an initial total bandwidth and comprises the one or more initial sub-channels, wherein the one or more performance metrics indicate a distance between the electronic device and the other electronic device; and in response to a determination that the other electronic device permits negotiation, perform the negotiation, based at least in part on the distance and a set of allowed transmit powers for corresponding to the set of sub-channels, to modify the one or more initial sub-channels in response to comparing the one or more performance metrics to one or more modification criteria;

select one or more first sub-channels in the set of sub-channels that differ from the one or more initial sub-channels based at least in part on the negotiation.

13. A computer-program product for use in conjunction with an electronic device, the computer-program product comprising a non-transitory computer-readable storage medium and a computer-program mechanism embedded therein to determine a modification to one or more initial sub-channels in a link with another electronic device, the computer-program mechanism including instructions that when executed cause the electronic device to:

receive, from the other electronic device, information identifying one or more initial sub-channels in a set of sub-channels selected by the other electronic device;

detect a sub-channel selection triggering event;

obtain, based at least in part on the sub-channel selection triggering event, one or more performance metrics associated with the link with the other electronic device, wherein the link with the other electronic device has an initial total bandwidth and comprises the one or more initial sub-channels;

in response to a determination that the other electronic device permits negotiation with the electronic device, perform the negotiation with the other electronic device to modify the one or more initial sub-channels in response to comparing the one or more performance metrics to one or more modification criteria and based at least in part on a set of allowed transmit powers for corresponding to the set of sub-channels; and select one or more first sub-channels in the set of sub-channels that differ from the one or more initial sub-channels based at least in part on the negotiation.

14. The computer-program product of claim 13, the computer-program mechanism including instructions that when executed cause the electronic device to communicate the one or more first sub-channels to the other electronic device so that the other electronic device uses the one or more first sub-channels in subsequent communication with the electronic device in response to the determination that the other electronic device permits the negotiation.

15. The computer-program product of claim 13, the computer-program mechanism including instructions that when executed cause the electronic device to use the one or more first sub-channels during subsequent data transmissions to the other electronic device in response to a determination that the other electronic device does not permit the negotiation.

16. The computer-program product of claim 13, the computer-program mechanism including instructions that when executed cause the electronic device to:

select the one or more first sub-channels that have highest allowed transmit powers among a group of first sub-channels in the set of sub-channels in response to the one or more first sub-channels increasing the initial total bandwidth;

select one or more second sub-channels that have highest allowed transmit powers among a group of second sub-channels in the set of sub-channels in response to the one or more first sub-channels decreasing the initial total bandwidth; and select one or more third sub-channels that have highest allowed transmit powers among a group of third sub-channels in the set of sub-channels in response to the one or more first sub-channels maintaining the initial total bandwidth.

17. A processor-based method, performed by an electronic device, for determining a modification to one or more initial sub-channels in a link with another electronic device, wherein the method comprises:

receiving, from the other electronic device, information identifying the one or more initial sub-channels in a set of sub-channels selected by the other electronic device:

detecting a sub-channel selection triggering event;

obtaining, based at least in part on the sub-channel selection triggering event, one or more performance metrics associated with the link with the other electronic device, wherein the link with the other electronic device has an initial total bandwidth and includes the one or more initial sub-channels in the set of sub-channels, wherein the one or more performance metrics indicates a distance between the electronic device and the other electronic device;

in response to a determination that the other electronic device permits negotiation, performing the negotiation with the other electronic device, based at least in part on the distance and a set of allowed transmit powers for corresponding to the set of sub-channels, to modify the one or more initial sub-channels in response to comparing the one or more performance metrics to one or more modification criteria;

selecting one or more first sub-channels in the set of sub-channels that differ from the one or more initial sub-channels, wherein, in response to the one or more first sub-channels increasing the initial total bandwidth, the one or more first sub-channels are added to the one or more initial sub-channels, wherein, in response to the one or more first sub-channels decreasing the initial total bandwidth, the one or more first sub-channels are removed from the one or more initial sub-channels; and wherein, in response to the one or more first sub-channels maintaining the initial total bandwidth, the one or more first sub-channels change at least a subset of the one or more initial sub-channels.

18. The method of claim 17, wherein, in response to the determination that the other electronic device permits the negotiation, the method includes communicating the one or more first sub-channels to the other electronic device so that the other electronic device uses the one or more first sub-channels in subsequent communication with the electronic device; and wherein, in response to a determination that the other electronic device does not permit the negotiation, the method includes using the one or more first sub-channels during subsequent data transmissions to the other electronic device.

19. The method of claim 17, wherein, in response to the one or more first sub-channels increasing the initial total bandwidth, selecting the one or more first sub-channels that have highest allowed transmit powers among a group of first sub-channels in the set of sub-channels;
- wherein, in response to the one or more first sub-channels decreasing the initial total bandwidth, selecting one or more second sub-channels that have highest allowed transmit powers among a group of second sub-channels in the set of sub-channels; and
- wherein, in response to the one or more first sub-channels maintaining the initial total bandwidth, selecting one or more third sub-channels that have highest allowed transmit powers among a group of third sub-channels in the set of sub-channels.

20. The method of claim 17, wherein the allowed transmit powers are stored in a look-up table on the electronic device; and
- wherein the allowed transmit powers are accessed in the look-up table based at least in part on information specifying a regulatory region in which the electronic device is located.

\* \* \* \* \*

UNITED STATES PATENT AND TRADEMARK OFFICE
CERTIFICATE OF CORRECTION

PATENT NO. : 10,263,753 B2  
APPLICATION NO. : 14/850834  
DATED : April 16, 2019  
INVENTOR(S) : Li et al.

It is certified that error appears in the above-identified patent and that said Letters Patent is hereby corrected as shown below:

In the Claims

Claim 13, Column 17, Line 26, "identifying one or more" should read --identifying the one or more--.

Signed and Sealed this
Twenty-eighth Day of April, 2020

Andrei Iancu
*Director of the United States Patent and Trademark Office*